(12) United States Patent
Agarwal et al.

(10) Patent No.: US 12,665,867 B2
(45) Date of Patent: Jun. 23, 2026

(54) SUMMARIZING CHAT SESSIONS TO MANAGE INFORMATION LOSS

(71) Applicant: MICROSOFT TECHNOLOGY LICENSING, LLC., Redmond, WA (US)

(72) Inventors: Anisha Agarwal, San Francisco, CA (US); Neelakantan Sundaresan, Bellevue, WA (US); Michele Tufano, Bellevue, WA (US); Roshanak Zilouchian Moghaddam, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 18/916,692

(22) Filed: Oct. 15, 2024

(65) Prior Publication Data

US 2026/0106846 A1 Apr. 16, 2026

(51) Int. Cl.
| | |
|---|---|
| *G06F 15/16* | (2006.01) |
| *G06F 16/34* | (2019.01) |
| *H04L 51/02* | (2022.01) |
| *H04L 51/216* | (2022.01) |

(52) U.S. Cl.
CPC ............ *H04L 51/02* (2013.01); *G06F 16/345* (2019.01); *H04L 51/216* (2022.05)

(58) Field of Classification Search
CPC ...... H04L 51/02; H04L 51/216; G06F 16/345

USPC ......................................... 709/206, 204, 203
See application file for complete search history.

(56) References Cited

U.S. PATENT DOCUMENTS

| | | | | |
|---|---|---|---|---|
| 12,093,846 | B1 * | 9/2024 | Xue .................... | G06F 16/3329 |
| 12,481,835 | B1 * | 11/2025 | Titoruk .................. | G06F 40/35 |
| 2024/0414108 | A1 * | 12/2024 | Sun ......................... | H04L 51/02 |
| 2025/0298978 | A1 | 9/2025 | Padgett | |
| 2025/0300950 | A1 * | 9/2025 | Bayardelle ............ | H04L 51/216 |
| 2025/0356244 | A1 * | 11/2025 | Truong .................. | G06N 20/00 |
| 2025/0378092 | A1 * | 12/2025 | Ghalyan ............. | G06F 16/3329 |

OTHER PUBLICATIONS

Extended European Search Report Received for Application No. 25207403.4, Feb. 3, 2026, 10 Pages.
Packer, et al., "MemGPT: Towards LLMs as Operating Systems", arXiv:2310.08560v1, Oct. 12, 2023, 15 pages.

* cited by examiner

*Primary Examiner* — Kaylee J Huang
(74) *Attorney, Agent, or Firm* — Workman Nydegger

(57) ABSTRACT

A chat history between a user and a machine learning model is preserved despite the context window size constraint of the machine learning model to ensure an enduring understanding of the chat or conversation history. When the token constraint of the context window size is reached, a summary of the chat history is generated to replace the chat history. The original content of the summarized chat history is stored in a lookup table and indexed by keywords. Instructions are provided to the model that allow the model to ask for the original content of the chat history summary which is obtained from the lookup table and provided to the model.

20 Claims, 6 Drawing Sheets

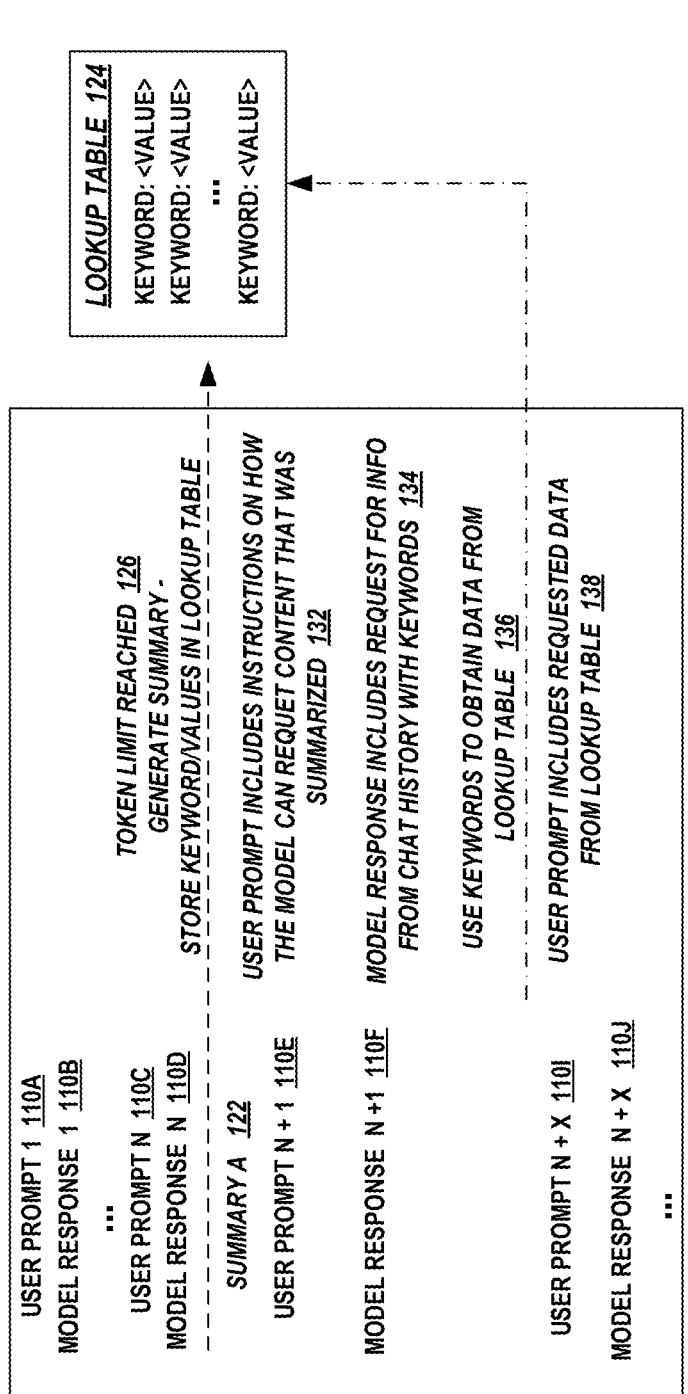

LOOKUP TABLE 124

KEYWORD: <VALUE>
KEYWORD: <VALUE>
...
KEYWORD: <VALUE>

CHAT HISTORY 138

USER PROMPT 1  110A
MODEL RESPONSE 1  110B
...
USER PROMPT N  110C
MODEL RESPONSE N  110D

TOKEN LIMIT REACHED  126
GENERATE SUMMARY -
STORE KEYWORD/VALUES IN LOOKUP TABLE

SUMMARY A  122
USER PROMPT N + 1  110E

USER PROMPT INCLUDES INSTRUCTIONS ON HOW
THE MODEL CAN REQUET CONTENT THAT WAS
SUMMARIZED  132

MODEL RESPONSE  N +1  110F

MODEL RESPONSE INCLUDES REQUEST FOR INFO
FROM CHAT HISTORY WITH KEYWORDS  134

USE KEYWORDS TO OBTAIN DATA FROM
LOOKUP TABLE  136

USER PROMPT N + X  110I

USER PROMPT INCLUDES REQUESTED DATA
FROM LOOKUP TABLE  138

MODEL RESPONSE  N + X  110J
...

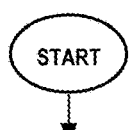

START

INITIALIZE CHAT SESSION - CONTEXT WINDOW, LOOKUP TABLE, CHAT HISTORY  202

DO UNTIL CHAT SESSION COMPLETED  204

> OBTAIN USER QUERY  206

> COMPUTE CONTEXT WINDOW SIZE  208

> GENERATE PROMPT FOR USER QUERY  210
>
> > IF CONTEXT WINDOW SIZE < MAX  212
> >
> > * GENERATE PROMPT FOR RESPONSE TO QUERY - P(INSTRUCTIONS, USER QUERY, CHAT HISTORY)  AND TRANSMIT TO MODEL  214
> > * STORE PROMPT IN CHAT HISTORY  216
>
> > IF CONTEXT WINDOW SIZE >= MAX  218
> >
> > * GENERATE PROMPT FOR CHAT HISTORY SUMMARY - P(INSTRUCTIONS, USER QUERY, CHAT HISTORY)  AND TRANSMIT TO MODEL  220

> RECEIVE MODEL RESPONSE FOR USER PROMPT  222
>
> > IF MODEL RESPONSE INCLUDES SUMMARY  224
> >
> > * REPLACE CHAT HISTORY WITH SUMMARY  226
> > * GENERATE KEYWORDS AND UPDATE LOOKUP TABLE  228
>
> > IF MODEL RESPONSE INCLUDES REQUEST FOR ADDITIONAL DATA  230
> >
> > * OBTAIN ADDITIONAL DATA FROM LOOKUP TABLE USING KEYWORDS  232
> > * GENERATE PROMPT INCLUDING ADDITIONAL DATA FROM LOOKUP TABLE  234
> > * TRANSMIT PROMPT TO MODEL AND STORE IN CHAT HISTORY  236
>
> > OTHERWISE, RESPONSE DOES NOT INCLUDE SUMMARY OR REQUEST FOR ADDITIONAL DATA  238
> >
> > * OUTPUT RESPONSE TO USER INTERFACE  240
> > * STORE RESPONSE IN CHAT HISTORY  242

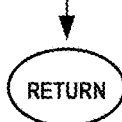

RETURN

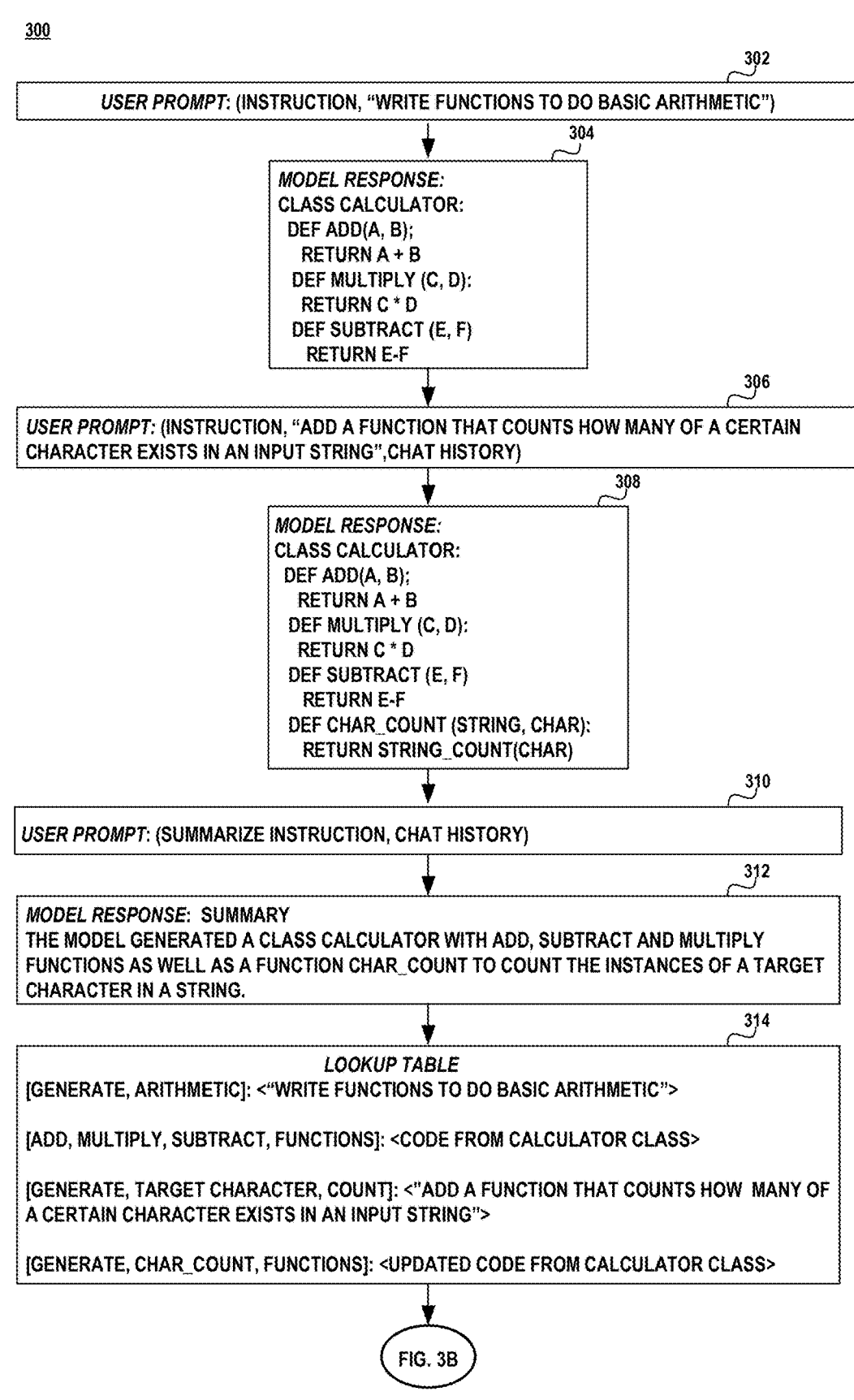

302

USER PROMPT: (INSTRUCTION, "WRITE FUNCTIONS TO DO BASIC ARITHMETIC")

304

```
MODEL RESPONSE:
CLASS CALCULATOR:
  DEF ADD(A, B);
    RETURN A + B
  DEF MULTIPLY (C, D):
    RETURN C * D
  DEF SUBTRACT (E, F)
    RETURN E-F
```

306

USER PROMPT: (INSTRUCTION, "ADD A FUNCTION THAT COUNTS HOW MANY OF A CERTAIN CHARACTER EXISTS IN AN INPUT STRING",CHAT HISTORY)

308

```
MODEL RESPONSE:
CLASS CALCULATOR:
  DEF ADD(A, B);
    RETURN A + B
  DEF MULTIPLY (C, D):
    RETURN C * D
  DEF SUBTRACT (E, F)
    RETURN E-F
  DEF CHAR_COUNT (STRING, CHAR):
    RETURN STRING_COUNT(CHAR)
```

310

USER PROMPT: (SUMMARIZE INSTRUCTION, CHAT HISTORY)

312

MODEL RESPONSE: SUMMARY
THE MODEL GENERATED A CLASS CALCULATOR WITH ADD, SUBTRACT AND MULTIPLY FUNCTIONS AS WELL AS A FUNCTION CHAR_COUNT TO COUNT THE INSTANCES OF A TARGET CHARACTER IN A STRING.

314

LOOKUP TABLE
[GENERATE, ARITHMETIC]: <"WRITE FUNCTIONS TO DO BASIC ARITHMETIC">

[ADD, MULTIPLY, SUBTRACT, FUNCTIONS]: <CODE FROM CALCULATOR CLASS>

[GENERATE, TARGET CHARACTER, COUNT]: <"ADD A FUNCTION THAT COUNTS HOW MANY OF A CERTAIN CHARACTER EXISTS IN AN INPUT STRING">

[GENERATE, CHAR_COUNT, FUNCTIONS]: <UPDATED CODE FROM CALCULATOR CLASS>

SUMMARIZING CHAT SESSIONS TO MANAGE INFORMATION LOSS

BACKGROUND

A large language model is a type of machine learning model trained on a massively-large training dataset of text and/or source code resulting in the model containing billions and more parameters. The large language model is used to perform various tasks such as natural language processing, text generation, machine translation, and source code generation. The large language model is based on deep learning neural networks.

The large language model is given a prompt which is an input sequence of tokens that the model processes to generate an output. The context window is the collection of tokens that the model can access and use in its processing. The size of the context window dictates the number of tokens that are included in the prompt. At times, the limited context window becomes challenging when the model needs a considerable amount of background information to generate an output that exceeds the size of the context window.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A chat session with a large language model consists of an ordered sequence of user prompts and model responses. The ordered sequence of the user prompts and model responses is stored in a chat history and provided to the model in each subsequent prompt as the context of the conversation. When a user prompt exceeds the context window size of the model, a summary of the chat history is generated. The original content that was summarized is stored in a lookup table and provided to the model when requested by the model. In this manner, the model is provided with an enduring understanding of the conversation even when the context window size limit is reached.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIGS. 1A and 1B illustrate an exemplary system for summarizing a chat session to manage information loss.

FIG. 2 is a flow chart illustrating an exemplary method of the system for summarizing a chat session to manage information loss.

FIGS. 3A and 3B are a schematic diagram illustrating an exemplary chat session.

DETAILED DESCRIPTION

Overview

Figure 1A:
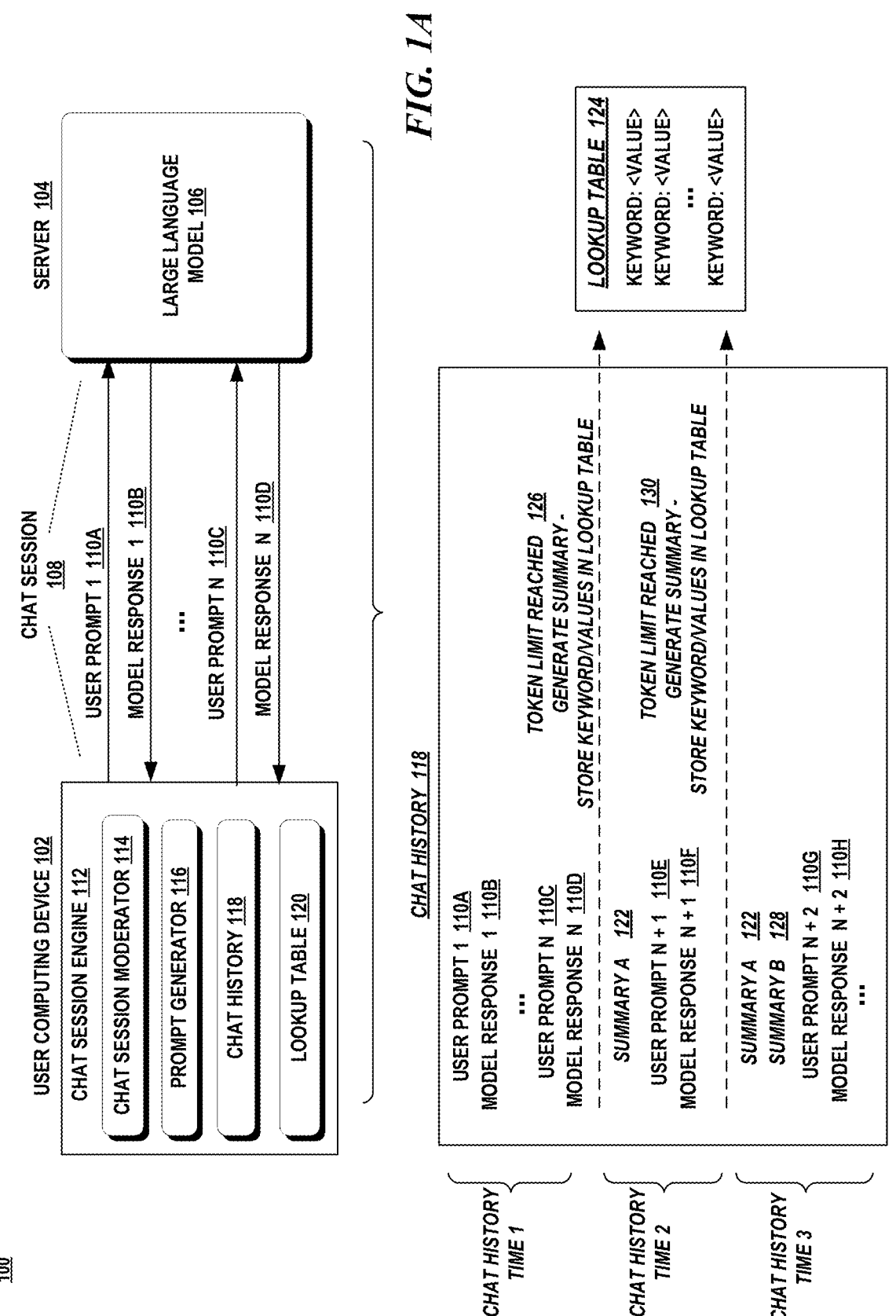

The subject matter disclosed pertains to an automated system for managing the chat history of a chat session with a machine learning model. A user engages in a conversation or chat session with a machine learning model through an ordered sequence of user prompts and model responses. The user prompt instructs the model to perform a task and includes data related to the task. The model responds to the prompt with a response. Often the prompts within a chat session are related where the response from one prompt leads to a subsequent prompt that is related to the previous prompt and response. However, the model does not retain the state or information from the previous prompts and responses since a stateless communication protocol is used to communicate with the model.

A chat history stores the prompts and responses used within a chat session. The chat history is often included as part of each prompt in a chat session for the model to understand the context of the conversation. A prompt that includes the chat history cannot exceed the size of the model's context window. When the user query and the chat history approach the model's context window limit, a chat summary is generated which replaces the content of the chat history. In an aspect, a lookup table is used to store the content that was summarized and is indexed by keywords representing the stored content. The term "original content" refers to apart of the chat history that is summarized, before it was summarized. There can be a plurality of entries in the look up table, each entry having a different part of the chat history that has been summarized, before it was summarized. The parts of the chat history in the table can be overlapping. Note that it is not essential to use a look up table.

In some cases, a vector database may be used. In the case of a vector database each original content item is encoded into a contextualized embedding vector using the machine learning model or any other encoder such as the Bidirectional Encoder Representations from Transformer ("BERT") model. The original content items and associated vectors are stored. To retrieve an original content item from the store, the machine learning model encodes the query using the encoder and a vector search is done to find original content items with similar vectors. In the case of an indexed look up table, entries in the table may be indexed using keywords or using other types of indices such as timestamps where a timestamp indicates a relative position in a chat history. Additionally, the entries in the table may be indexed using embeddings of keywords describing the original content.

In a prompt issued after a chat summary is generated, the model is given the choice of requesting more detailed information from the summarized chat history. The lookup table is used to obtain the detailed information which is then sent back to the model. In this manner, the content of the summarized chat history is preserved and provided to the model when needed. This technique ensures that the conversation continues and the model does not loose information needed to generate an accurate response.

Attention now turns to a system, device, and method for summarizing a chat session to manage information loss.
System FIG. 1 represents an exemplary system 100 where the chat history of a chat session is summarized. The system 100 includes a user computing device 102 and a server 104. The server 104 hosts a large language model 106 accessed by the user computing device 102. A user through the user computing device 102 engages in a chat session or conversation 108 with the large language model 106. The chat session 108 includes an ordered sequence of user prompts and model responses 110A-110F.

A chat session engine 112 manages the interactions between the user and the server 104 that hosts the large language model 106. The chat session engine 112 includes a chat session moderator 114, a prompt generator 116, a chat history 118, and a lookup table 120. The chat session moderator 114 processes the communications between the user computing device 102 and the large language model 106. The prompt generator 116 generates the prompts that are transmitted to the large language model 106 and receives the model responses. The chat history 118 contains the prompts and model responses of a chat session 108. The lookup table 120 stores the original content of a chat history that was summarized.

The chat history 118 contains the prompts and model responses 110A-110F exchanged within a user's chat session 108. When the prompt reaches the context window token limit 126, a summary of the user prompts and responses is generated. The summary is stored in the chat history in place of the summarized prompts and responses. Content of the summarized chat history is stored in the lookup table 124 as a <value> and indexed by a corresponding keyword.

The chat history evolves over time during the chat session. As shown in FIG. 1A, the chat history at time point 1 contains the user prompts and model responses before the context window token limit is reached. After the summary is generated, the chat history appears as shown in time point 2 which includes the summary of the chat history at time point 1, or summary A, and other user prompts and model responses that occur after summary A is generated. When the context window token limit is reached again 130, a second summary is generated for user prompts and model responses 110E-110F. The chat history appears as shown in time point 3 which includes summary A 122, summary B 128, and user prompts and model responses 110 G-111H that occur after summary B 128 is generated.

In an aspect, the large language model 106 is a deep learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

Examples of a large language model include the encoder and generative neural transformer models with attention offered by OpenAI i.e., ChatGPT and Codex models, PaLM, Chinchilla, and Bidirectional Encoder Representations from Transformers (BERT) offered by Google, the Gemini multimodal models of Google, LLaMa by Meta, and the phi-3 models offered by Microsoft.

In an aspect, the large language model is hosted on an external server and accessed over a network through application programming interfaces (API). The training of a large language model requires a considerable amount of training data and computing resources which makes it impossible for some developers to create their own models. Instead, third-parties having created a large language model may offer access to the large language model as a cloud service to developers with or without a fee.

The input or prompt to the large language model is constrained to the size of the context window of the large language model. A context window is the number of tokens that the large language model can process in a forward pass. The tokens represent the natural language text and/or source code contained in the prompt. Each token corresponds to a small group of characters. The size of a context window varies and may include 4096-200K tokens, such as with Github's CoPilot Codex to 32,000 tokens for OpenAI's GPT-4 model.

Turning to FIG. 1B, there is shown the chat history 138 after a summary has been generated 126. In a prompt after the chat summary 122 has been made, the prompt generator may instruct the model on how to request additional information if needed 132. The model may respond with a request for the additional data with the keywords identifying the needed data 134. A search is made in the lookup table 124 using the model-generated keywords to obtain the requested data 136 which is returned back to the model 138 in a subsequent prompt 1101. The model then returns a response 110J.

Methods.

A description of the various exemplary methods that utilize the system and devices is disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Turning to FIG. 2, there is shown an exemplary method of the summarization system 200. The method begins with a user initiating a chat session with a large language model (block 202). The context window, the chat history, and the lookup table are initialized (block 202).

Until the chat session is terminated (block 204), the chat session engine obtains a user query (block 206). The chat session moderator determines the context window size of a prompt to include at least the user query and the chat history (block 208). The prompt generator generates a user prompt for either a model response or for the model to summarize the chat history (block 210). If the context window size is within a maximum token limit, the user prompt generator generates a user prompt that instructs the model to perform an intended task based on the user query (block 212). The user prompt includes instructions, the user query, and the chat history (block 214). The user prompt is transmitted to the model (block 214) and the user prompt is stored in the chat history (block 216).

When the context window size exceeds the maximum token limit (block 218), the prompt generator generates a user prompt for the model to summarize the chat history (block 220). The user prompt includes instructions, the user query, and the chat history and is transmitted to the model (block 220). By using the model to summarize the chat history efficiencies are gained since the model already has the chat history. By using the model to summarize the chat history, security is enhanced since the model already has the chat history and it is not necessary for another computing entity to access the chat history, thus keeping the number of computing entities with access to the chat history to a minimum and reducing the attack space.

The model then responds to the user prompt (block 222). The response may include a chat history summary (block 224), a request for additional data (block 230) or a response to a prompt (block 238).

In the case of a response including a chat history summary (block 224), the chat history is cleared from memory and replaced with the summary (block 226). In this way memory efficiency is gained. A keyword detection algorithm is used to generate the keywords that index the original content that was summarized into the lookup table. In an aspect, a term frequency-inverse document frequency (TFIDF) algorithm is employed as the keyword detection algorithm. The TFIDF process measures the significance of the words in the chat history. It is composed of a term frequency score multiplied by an inverse document frequency score. The term frequency score is a measure of the frequency of a term in a particular prompt or model response and the inverse document frequency score is a measure of how frequently a term occurs in the chat history. Alternatively, user-defined rules may specify how the indices are to be created. The user-defined rules may specify that the names of functions and classes are used as the indices and the values are the full function definitions and content.

In the case of a response requesting additional data (block 230), the model returns keywords describing the additional data, since the model has been given the option to do so in the prompt. The keywords are used, by the chat session moderator, to obtain the requested data from the lookup table (block 232). A user prompt is generated that includes an instruction, the user query, the chat history and the requested data (block 234) which is transmitted to the model (block 236).

In the case where the response does not include a summary or request additional data (block 238), the response is output to the user through a user interface (block 240) and stored in the chat history (block 242). The process iterates until the chat session is completed (block 204).

Figure 3B:
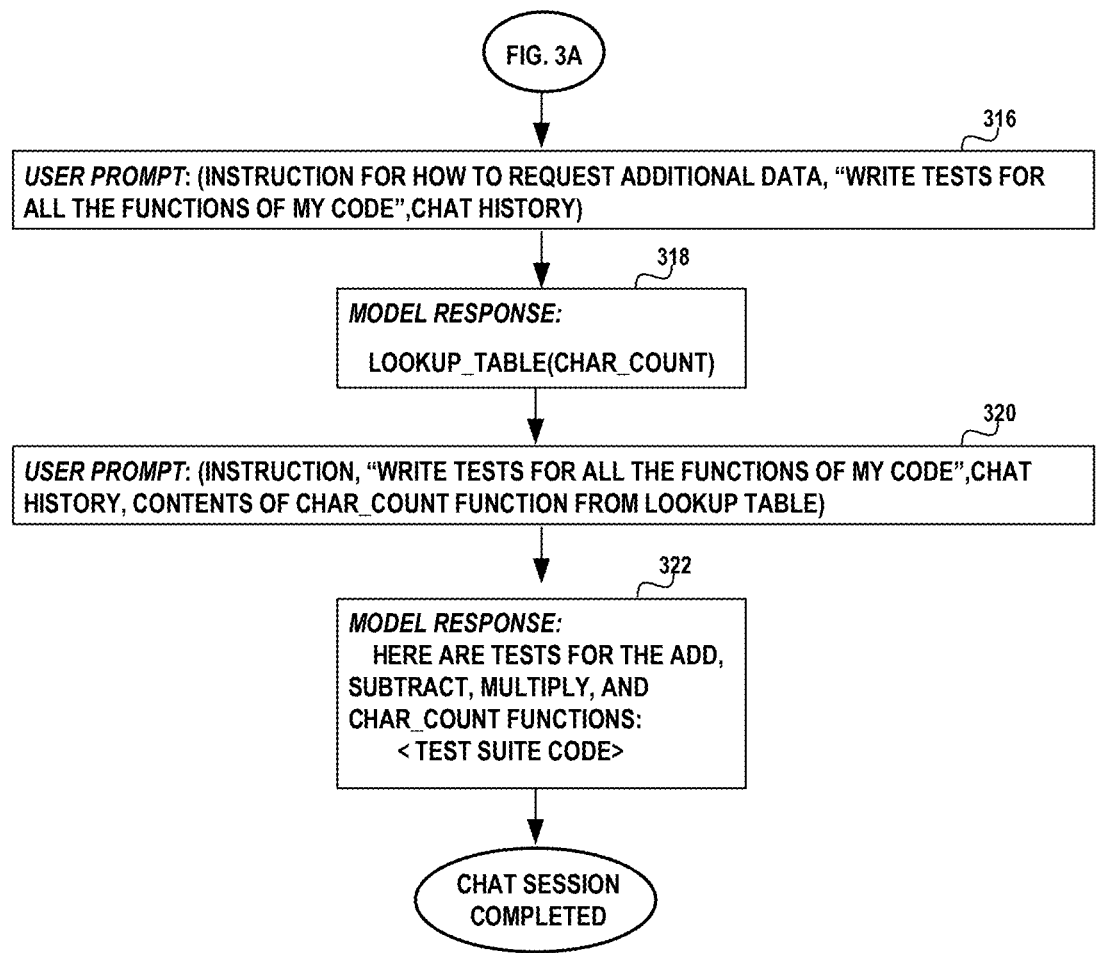

Turning to FIGS. 3A-3B, there is shown an exemplary chat session utilizing the summarization technique 300. Initially, a user prompt 302 includes instructions and the user query "Write Functions To Do Basic Arithmetic." There is no chat history at this point since this is the first user prompt of the chat session.

The model generates a response 304 which includes Python source code for a Calculator class having functions for an Add function, a Multiply function, and a Subtract function. The next user prompt 306 contains instructions, a user query that includes "Add A Function That Counts How Many Of A Certain Character Exists In An Input String" and the chat history. The chat history consists of the previous prompt 302 and response 304.

The model generates a response 308 which includes Python source code for the Calculator class having functions for an Add function, a Multiply function, a Subtract function, and a Char_Count function.

A user query is then received and the prompt generator realizes that the context window limit has been reached. In this case, a user prompt is generated for the model to summarize the chat history 310. The user prompt includes instructions to summarize the chat history and the chat history 310. The prompt is transmitted to the model which responds with the summary 312. The content of the summarized chat history is then stored in the lookup table 314. For each portion of the summarized chat history, keywords are generated to index the associated content. For example, the user query "Write Functions To Do Basic Arithmetic" is indexed by the keywords Generate and Arithmetic. The source code from the calculator class is indexed by the keywords Add, Multiply, Subtract, and Functions. The user query "Add a Function That Counts How Many of a Certain Character Exists in an Input String" is indexed by the keywords Generate, Target Character, and Count. The updated code from the calculator class is indexed by the keywords Generate, Char_Count, and Functions.

The chat session continues with a user prompt for the user query "Write tests for all the functions of my code" 316. This user prompt includes instructions on how the model may request additional data since a summary has been created. The instructions indicate that the model is to provide the keywords for the requested additional data. The prompt includes the instructions on how the model may request additional data, the user query and the chat history 316.

The model responds 318 with the keywords of the additional data it needs in order to respond to the user query, which is lookup_table(char_count). The next user prompt includes an instruction, the user query, the chat history and the requested additional data 320. The additional data is retrieved, by the chat session moderator, from the lookup table using the keywords generated by the model. The model generates a response which includes a test suite for the Add, Subtract, Multiply and Char_Count functions 322. The user then terminates the chat session.

Exemplary Operating Environment

Figure 4:
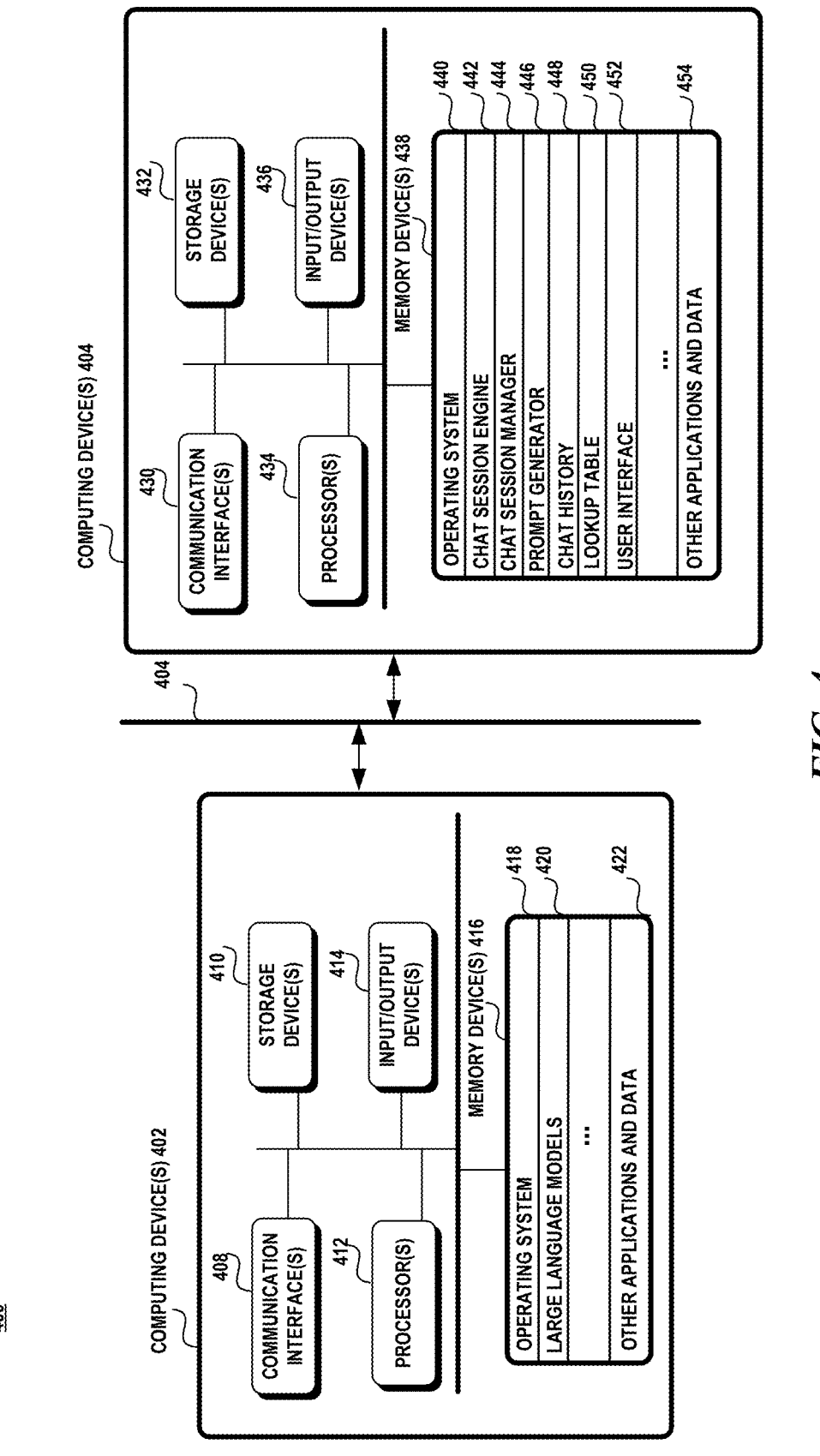
FIG. 4 is a block diagram illustrating an exemplary operating environment.

Attention now turns to a discussion of an exemplary operating environment. FIG. 4 illustrates an exemplary operating environment 400 in which one or more computing devices 402 are used to monitor a chat session between a user and a large language model, to generate the prompts, to summarize a chat history, and to store the chat session in a chat history and lookup table. One or more computing devices 404 are used to host the large language model which uses the prompt to generate a response. However, it should be noted that the aspects disclosed herein is not constrained to any particular configuration of devices. In another aspect, a single computing device may host the large language model and monitor the chat sessions.

A computing device 402, 404 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 400 may be configured in a network environment, a distributed environment, a multi-processor environment, or a stand-alone computing device having access to remote or local storage devices.

The computing device 402, 404 may include one or more processors 412, 434, one or more communication interfaces 408, 430, one or more storage devices 410, 432, one or more input/output devices 414, 436, and one or more memory devices 416, 438. A processor 412, 434 may be any commercially available or customized processor and may include dual microprocessors and multi-processor architectures. A communication interface 408, 430 facilitates wired or wireless communications between the computing device 402, 404 and other devices. A storage device 410, 432 may be a computer-readable medium that does not contain propagating signals, such as modulated data signals transmitted through a carrier wave. Examples of a storage device 410, 432 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 410, 432 in a computing device 402, 404. The input/output devices 414, 436 may include a keyboard, mouse, pen, voice input device, touch input device, display, speakers, printers, etc., and any combination thereof.

A memory device or memory 416, 438 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 416, 438 may also include one or more external storage devices or remotely located storage devices that do not pertain to propagated signals, such as modulated data signals transmitted through a carrier wave.

The memory device 416, 438 may contain instructions, components, and data. A component is a software program that performs a specific function and is otherwise known as a module, program, component, and/or application. The memory device 416 may include an operating system 418, one or more large language models 420, and other applications and data 422. The memory device 438 may include an operating system 440, a chat session engine 442, a chat session manager 444, a prompt generator 446, a chat history 448, a lookup table 450, a user interface 452 and other applications and data 454.

A computing device 402 may be communicatively coupled via a network 406. The network 406 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 406 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access

8

(HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of crafting a prompt within the size of a context window of a large language model. The technical features associated with addressing this problem is summarizing a chat history and preserving content of the chat history in a lookup table for later use. The technical effect achieved is the construction of a prompt within the limits of the context window size while maintaining the summarized content without undue increased computational burden.

The technique disclosed herein is advantageous over prior solutions that truncate the chat history to fit within the context window size constraint. The truncation selects the beginning portion of a chat history to include in a prompt and deletes the remaining portion. This truncation does not preserve the content of the truncated portion thereby loosing valuable information. This information loss produces suboptimal model responses.

By summarizing the conversation or chat history and replacing the summarized content with the summary, the number of tokens is reduced by an order of magnitude while also providing the model with some understanding of the chat history. The original content of the summarized chat history is preserved in a lookup table and the model is able to request access to the stored information. In this manner, if the model requires more specific context, it is able to find it without huge amounts of unnecessary context filling up the context window.

Although the context window size of machine learning models increases, it does not do so at a rate that matches the pace of the size of the user requests. Programmers can ask the model to generate full code files, entire test suites, page-long repository descriptions, and more. The need for a flexible, adaptable, inexpensive solution continues to increase. The technique described herein requires either one or more additional calls to the model each time the chat history approaches the context window token size constraint depending on whether the model decided it needed to lookup additional context before answering the user query.

One of ordinary skill in the art understands that the technical effects are the purpose of a technical embodiment. The mere fact that a calculation is involved in an embodiment does not remove the presence of the technical effects or alter the concrete and technical nature of the embodiments. Operations used to create the summarization in the manner disclosed are understood herein as inherently digital. The human mind cannot interface directly with a CPU or network interface card, or other processor, or with RAM or other digital storage, to read or write the necessary data and perform the necessary operations on digital values in the manner disclosed herein.

The embodiments are also presumed to be capable of operating at scale, within tight timing constraints in production environments, or in testing labs for production environments as opposed to being mere thought experiments.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

A system is disclosed comprising: a processor; and a memory that stores a program that is configured to be executed by the processor. The program comprises instructions to perform acts that: obtain a user query for a machine learning model to perform a task, wherein the machine learning model is limited to a fixed-size context window; maintain, in the memory, a chat history with the machine learning model, wherein the chat history comprises an ordered sequence of prompts and model responses; determine that a size of the user query and the chat history exceeds the fixed-size context window; generate a summary of the chat history; replace, in the memory, the chat history with the summary; preserve, in a store separate from the memory, original content of the summarized chat history; create a first prompt, wherein the first prompt comprises the summary and the user query; transmit the first prompt to the machine learning model; receive from the machine learning model the first response; and output the first response in a user interface.

In an aspect, the program comprises further instructions to perform acts that: store the first prompt and the first response in the chat history. In an aspect, the program comprises further instructions to perform acts that: invoke the machine learning model to generate the summary of the chat history. In an aspect, the program comprises further instructions to perform acts that: store the original content of the summarized chat history in an indexed table, wherein the store is indexed by keywords associated with the original content or embeddings associated with the user query.

In an aspect, the keywords represent commonly-used words found in the content of the summarized chat history. In an aspect, the program includes further instructions to perform acts that: obtain a subsequent user query; and generate a second user prompt comprising an instruction, the subsequent user query and the summarized chat history, wherein the instruction indicates how the machine learning model may request the original content of the summarized chat history.

In an aspect, the program comprises further instructions to perform acts that: receive a second model response to the second user prompt comprising requested original content of the summarized chat history and at least one keyword describing the requested original content of the summarized chat history.

In an aspect, the program comprises further instructions to perform acts that: extract the requested original content of the summarized chat history from the store using the at least one keyword. In an aspect, wherein the program comprises further instructions to perform acts that: generate a third user prompt comprising the requested original content of the summarized chat history extracted from the lookup table and the second user query.

A computer-implemented method is disclose comprising: monitoring a chat session with a machine learning model, wherein the chat session comprises an ordered sequence of user prompts followed by model responses, wherein the machine learning model has a fixed-size context window; recording a chat history of the chat session in a memory, wherein the chat history comprises the user prompts and corresponding model responses; receiving a user query for the machine learning model to perform a task; upon determining that a size of the user query and the chat history exceeds the fixed-size context window, summarizing the chat history, replacing the user prompts and model responses of the chat history with the summary, and storing original content of the summarized chat history in a select memory store; generating a first user prompt for the machine learning model to respond to the user query, wherein the first user prompt comprises the user query and the summarized chat history; receiving from the machine learning model a model response to the first user prompt; and displaying the model response in a user interface.

In an aspect, the computer-implemented method further comprises: storing the first user prompt and the model response in the chat history. In an aspect, the computer-implemented method further comprises: generating a second user prompt for the machine learning model to respond to a second user query, wherein the second user prompt comprises an instruction, the second user query and the summarized chat history, wherein the instruction indicates how the machine learning model requests the original content of the summarized chat history.

In an aspect, the computer-implemented method further comprises: receiving a second model response to the second user prompt, wherein the second model response contains at least one keyword associated with the requested original content of the summarized chat history.

In an aspect, the computer-implemented method further comprises: obtaining the requested original content of the summarized chat history from the select memory storage using the at least one keyword. In an aspect, the computer-implemented method further comprises: generating a third user prompt comprising the requested original content of the summarized chat history, the second user query, and the chat history.

A hardware storage device having stored thereon computer executable instructions that are structured to be executable by a processor of a computing device to thereby cause the computing device to perform actions that: facilitate a chat session with a machine learning model, wherein the chat session comprises a plurality of user prompts and model responses, wherein each user prompt is followed by a corresponding model response, wherein the machine learning model has a fixed-size token-constraint; record the plurality of user prompts and model responses of the chat session in a chat history of a memory; obtain a first user query for the machine learning model to perform a task; upon determination of a token size of the first user query and the chat history exceeding the fixed-size token-constraint of the machine learning model, summarize the chat history, replace the user prompts and model responses of the chat history with the summary, and store original content of the summarized chat history in an indexed table; generate a first user prompt for the machine learning model to respond to the first user query, wherein the first user prompt comprises the first user query and the summarized chat history; receive from the machine learning model a model response to the first user prompt; and display the model response in a user interface.

In an aspect, the hardware storage device has stored thereon computer executable instructions that are structured to be executable by a processor of a computing device to thereby cause the computing device to perform actions that: invoke the machine learning model to generate the summary of the chat history given the plurality of user prompts and model responses in the chat history.

In an aspect, the hardware storage device has stored thereon computer executable instructions that are structured to be executable by a processor of a computing device to thereby cause the computing device to perform actions that: generate a second user prompt for the machine learning model to respond to a second user query, wherein the second user prompt comprises an instruction, the second user query, and the chat history, wherein the instruction indicates how the machine learning model requests original content of the summarized chat history.

In an aspect, the hardware storage device has stored thereon computer executable instructions that are structured to be executable by a processor of a computing device to thereby cause the computing device to perform actions that: receive a second model response to the second user prompt, wherein the second model response includes a keyword associated with requested original content of the summarized chat history; and extract the requested original content of the summarized chat history using the keyword in the indexed table.

In an aspect, the hardware storage device has stored thereon computer executable instructions that are structured to be executable by a processor of a computing device to thereby cause the computing device to perform actions that: generate a third user prompt including the requested original content of the summarized chat history, the second user query, and the context history.

What is claimed:

1. A system comprising:
a processor; and
a memory that stores a program that is configured to be executed by the processor, wherein the program comprises instructions to perform acts that:
obtain a user query for a machine learning model to perform a task, wherein the machine learning model is limited to a fixed-size context window;
maintain, in the memory, a chat history with the machine learning model, wherein the chat history comprises an ordered sequence of prompts and model responses;
in response to determining that a size of the user query and the chat history exceeds the fixed-size context window:
generate a summarized chat history;
replace, in the memory, the chat history with the summarized chat history; and
preserve, in a store separate from the memory, original content of the summarized chat history;
create a first prompt, wherein the first prompt comprises the summarized chat history and the user query;
transmit the first prompt to the machine learning model;
receive from the machine learning model a first response to the first prompt; and output the first response in a user interface.

2. The system of claim 1, wherein the program comprises further instructions to perform acts that:
store the first prompt and the first response in the chat history.

3. The system of claim 1, wherein the program comprises further instructions to perform acts that:
invoke the machine learning model to generate the summarized chat history.

4. The system of claim 1, wherein the program comprises further instructions to perform acts that:
store the original content of the summarized chat history in an indexed table, wherein the store is indexed by keywords associated with the original content or embeddings associated with the user query.

5. The system of claim 4, wherein the keywords represent commonly-used words found in the original content of the summarized chat history.

6. The system of claim 1, wherein the program includes further instructions to perform acts that:
obtain a subsequent user query; and
generate a second user prompt comprising an instruction, the subsequent user query and the summarized chat history, wherein the instruction indicates how the machine learning model is to request original content of the summarized chat history.

7. The system of claim 6, wherein the program comprises further instructions to perform acts that:
receive a second model response to the second user prompt comprising the requested original content of the summarized chat history and at least one keyword describing the requested original content of the summarized chat history.

8. The system of claim 7, wherein the program comprises further instructions to perform acts that:
extract the requested original content of the summarized chat history from the store using the at least one keyword.

9. The system of claim 8, wherein the program comprises further instructions to perform acts that:
generate a third user prompt comprising the requested original content of the summarized chat history extracted from a lookup table and a second user query.

10. A computer-implemented method comprising:
monitoring a chat session with a machine learning model, wherein the chat session comprises an ordered sequence of user prompts followed by model responses, wherein the machine learning model has a fixed-size context window;
recording a chat history of the chat session in a memory, wherein the chat history comprises the user prompts and corresponding model responses;
receiving a user query for the machine learning model to perform a task;
upon determining that a size of the user query and the chat history exceeds the fixed-size context window, summarizing the chat history into a summarized chat history, replacing the user prompts and the corresponding model responses of the chat history with the summarized chat history in the memory, and storing original content of the summarized chat history in a select memory store;
generating a first user prompt for the machine learning model to respond to the user query, wherein the first user prompt comprises the user query and the summarized chat history;

transmitting the first user prompt to the machine learning model;

receiving from the machine learning model a model response to the first user prompt; and displaying the model response in a user interface.

11. The computer-implemented method of claim 10, further comprising:

storing the first user prompt and the model response in the chat history.

12. The computer-implemented method of claim 10, further comprising:

generating a second user prompt for the machine learning model to respond to a second user query, wherein the second user prompt comprises an instruction, the second user query and the summarized chat history, wherein the instruction indicates how the machine learning model requests original content of the summarized chat history.

13. The computer-implemented method of claim 12, further comprising:

receiving a second model response to the second user prompt, wherein the second model response contains at least one keyword associated with the requested original content of the summarized chat history.

14. The computer-implemented method of claim 13, further comprising:

obtaining the requested original content of the summarized chat history from the select memory store using the at least one keyword.

15. The computer-implemented method of claim 14, further comprising:

generating a third user prompt comprising the requested original content of the summarized chat history, the second user query, and the chat history.

16. A hardware storage device having stored thereon computer executable instructions that are structured to be executable by a processor of a computing device to thereby cause the computing device to perform actions that:

facilitate a chat session with a machine learning model, wherein the chat session comprises a plurality of user prompts and model responses, wherein each user prompt is followed by a corresponding model response, wherein the machine learning model has a fixed-size token-constraint;

record the plurality of user prompts and model responses of the chat session in a chat history of a memory;

obtain a first user query for the machine learning model to perform a task;

upon determination of a token size of the first user query and the chat history exceeding the fixed-size token-constraint of the machine learning model, summarize the chat history into a summarized chat history, replace the plurality of user prompts and model responses of the chat session with the summarized chat history in the memory, and store original content of the summarized chat history in an indexed table;

generate a first user prompt for the machine learning model to respond to the first user query, wherein the first user prompt comprises the first user query and the summarized chat history;

transmit the first user prompt to the machine learning model;

receive from the machine learning model a model response to the first user prompt; and display the model response in a user interface.

17. The hardware storage device of claim 16 having stored thereon computer executable instructions that are structured to be executable by the processor of the computing device to thereby cause the computing device to perform actions that:

invoke the machine learning model to generate the summarized chat history given the plurality of user prompts and model responses in the chat history.

18. The hardware storage device of claim 16, having stored thereon computer executable instructions that are structured to be executable by the processor of the computing device to thereby cause the computing device to perform actions that:

generate a second user prompt for the machine learning model to respond to a second user query, wherein the second user prompt comprises an instruction, the second user query, and the chat history, wherein the instruction indicates how the machine learning model requests original content of the summarized chat history.

19. The hardware storage device of claim 18, having stored thereon computer executable instructions that are structured to be executable by the processor of the computing device to thereby cause the computing device to perform actions that:

receive a second model response to the second user prompt, wherein the second model response includes a keyword associated with requested original content of the summarized chat history; and extract the requested original content of the summarized chat history using the keyword in the indexed table.

20. The hardware storage device of claim 19, having stored thereon computer executable instructions that are structured to be executable by the processor of the computing device to thereby cause the computing device to perform actions that:

generate a third user prompt including the requested original content of the summarized chat history, the second user query, and the chat history.

* * * * *